United States Patent
Raj et al.

(10) Patent No.: US 10,068,675 B1
(45) Date of Patent: Sep. 4, 2018

(54) ADVANCED PROTECTIVE COATINGS FOR GR-BASED NUCLEAR PROPULSION FUEL ELEMENTS

(71) Applicant: The United States of America as represented by the Administrator of the National Aeronautics and Space Administration, Washington, DC (US)

(72) Inventors: Sai V. Raj, Strongsville, OH (US); Mark Stewart, Cleveland, OH (US); James A. Nesbitt, Brookpark, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 522 days.

(21) Appl. No.: 14/518,075

(22) Filed: Oct. 20, 2014

Related U.S. Application Data

(60) Provisional application No. 61/898,749, filed on Nov. 1, 2013.

(51) Int. Cl.
  *G21C 3/20* (2006.01)
  *G21D 5/02* (2006.01)
  (Continued)

(52) U.S. Cl.
  CPC ............. *G21C 3/20* (2013.01); *C08K 3/08* (2013.01); *C08K 3/14* (2013.01); *C09D 1/00* (2013.01);
  (Continued)

(58) Field of Classification Search
  CPC .......... G21C 3/626; G21C 3/20; G21C 21/02; C08K 3/08; C08K 3/14; C09D 1/00; C09D 5/08; G21D 5/02; C04B 41/89
  (Continued)

(56) References Cited

U.S. PATENT DOCUMENTS 2,929,741 A * 3/1960 Steinberg ............... G21O 5/126
                                                       376/414
3,969,186 A   7/1976 Thompson et al.
(Continued)

OTHER PUBLICATIONS

Pelaccio, "A review of nuclear thermal propulsion carbide fuel corrosion and key issues", NASA-CR-197533, Nov. 1994.*
(Continued)

*Primary Examiner* — Jack W Keith
*Assistant Examiner* — Daniel D Wasil
(74) *Attorney, Agent, or Firm* — Robert H. Earp, III; William M. Johnson

(57) ABSTRACT

A protective coating for a graphite (Gr) containing fuel element used in a nuclear thermal propulsion system includes a first layer that is configured to resist hot hydrogen attacks. The first layer has a coefficient of thermal expansion that is higher than a coefficient of thermal expansion of the Gr containing substrate. The coating also includes a plurality of second layers located between the first layer and the substrate. The second layers are configured to mitigate the differences in coefficients of thermal expansion between the first layer and the substrate to minimize debonding and exposure of the substrate to hydrogen attack. Preferably, the protective coating can comprise an outermost first layer including zirconium carbide (ZrC), a second layer including niobium (Nb), a third layer including molybdenum (Mo), and a fourth layer including molybdenum carbide ($Mo_2C$) located adjacent to the substrate.

7 Claims, 9 Drawing Sheets

(51) Int. Cl.
  *C09D 5/08* (2006.01)
  *C09D 1/00* (2006.01)
  *C08K 3/14* (2006.01)
  *C08K 3/08* (2006.01)
  *G21C 3/62* (2006.01)

(52) U.S. Cl.
  CPC ............... *C09D 5/08* (2013.01); *G21D 5/02* (2013.01); *G21C 3/626* (2013.01)

(58) Field of Classification Search
  USPC ........................................ 376/414, 416; 427/6
  See application file for complete search history.

(56) References Cited

U.S. PATENT DOCUMENTS

| | | |
|---|---|---|
| 4,022,662 A | 5/1977 | Gordon et al. |
| 4,029,545 A | 6/1977 | Gordon et al. |
| 4,045,288 A | 8/1977 | Armijo |
| 4,284,660 A | 8/1981 | Donaghy et al. |
| 4,372,817 A | 2/1983 | Armijo et al. |
| 4,406,012 A | 9/1983 | Gordon et al. |
| 4,473,410 A | 9/1984 | Grubb et al. |
| 4,963,758 A | 10/1990 | Noren et al. |
| 4,978,480 A | 12/1990 | Stansfield et al. |
| 5,094,804 A | 3/1992 | Schweitzer |
| 5,192,495 A | 3/1993 | Caldwell et al. |
| 7,521,007 B1* | 4/2009 | Jarvinen ............ G21C 3/04 376/412 |
| 7,666,463 B1 | 2/2010 | Youchison et al. |
| 7,899,146 B1 | 3/2011 | Youchison et al. |
| 8,526,566 B1* | 9/2013 | Youchison ............ G21C 3/58 376/414 |
| 2005/0064247 A1* | 3/2005 | Sane ............... C23C 16/36 428/698 |
| 2008/0240334 A1* | 10/2008 | Senor ............... G21C 3/02 376/416 |
| 2009/0129533 A1 | 5/2009 | Kuczynski |

OTHER PUBLICATIONS

Burykina, "New Heat-Resistant Materials for Work in Contact With Refractory Metals", FTD-HT-23-892-68, Nov. 1968.*

* cited by examiner

ADVANCED PROTECTIVE COATINGS FOR GR-BASED NUCLEAR PROPULSION FUEL ELEMENTS

CROSS REFERENCE TO RELATED APPLICATION

This application claims benefit pursuant to 35 U.S.C. § 119(e) of U.S. provisional application 61/898,749 filed Nov. 1, 2013, which is herein incorporated by reference in its entirety.

ORIGIN OF THE INVENTION

The invention described herein was jointly made by employees of the United States Government and may be manufactured and used by or for the Government for Government purposes without the payment of any royalties thereon or therefore. The invention described herein was also jointly made in the performance of work under a NASA contract and is subject to the provisions of Section 305 of the National Aeronautics and Space Act, Public Law 111-314 § 3 (124 Stat. 3330; 51 Chapter 201).

BACKGROUND OF THE INVENTION

Fuel elements for nuclear reactors are used in, or are being considered for many applications such as by the commercial nuclear power industry, by the military for nuclear powered submarines and ships, and by the aerospace industry for outer space systems. Specifically, the fuel elements used in hot hydrogen gas propelled nuclear thermal propulsion (NTP) engines may contain a graphite (Gr) Gr based substrate. In these applications, cryogenic hydrogen is heated to a high temperature by a nuclear reactor. The pre-heated hydrogen working fluid may enter the NTP engine at about 355-370 K, and may be further heated to 2500-2700 K in the nuclear reactor, where it expands through a rocket nozzle to create thrust. Thus, the energy from the nuclear reactor is used in lieu of the chemical energy produced by reactive chemicals in a chemical rocket. Nuclear thermal rockets can have a higher effective exhaust velocity and higher propulsion efficiency than conventional chemical rockets.

However, uncoated UC (uranium carbide) nuclear fuel embedded in either a Gr or a Gr/ZrC (graphite/zirconium carbide) substrate, is susceptible to hot hydrogen attack of the Gr-based substrate. This hot hydrogen corrosive (erosive) attack occurs when the hydrogen reacts with the Gr-based substrate to form methane and other hydrocarbons. As a result, the Gr-based substrate erodes with time, which affects the reactor neutronics and performance leading to a premature shut-down of the NTP engine.

Under the project Rover and Nuclear Engine Rocket Vehicle Application (NERVA) programs, a protective NbC (niobium carbide) or ZrC coating was deposited in the inner cooling channels of the fuel elements through which the hydrogen propellant flows. The coating was applied by chemical vapor deposition (CVD). During the later stages of these programs, the ZrC coating was shown to be a more effective protective coating than the NbC coating, so that ZrC was the preferred coating.

FIG. 1 shows the schematic layout of an array of coated coolant channels in the fuel elements. Although these coatings proved to be effective in improving engine performance and increasing its operating life over using uncoated fuel elements, these coatings were not completely effective in protecting the Gr-based substrates since the coefficients of thermal expansion (CTE) of NbC and ZrC are higher than those of Gr as shown in Table 1 below.

TABLE 1

Coefficients of thermal expansion for Gr, NbC, uranium carbide and ZrC

| Material | T (K) | $\alpha$ ($\times 10^{-6}$) ($K^{-1}$) |
|---|---|---|
| Gr (GrafTech XTE 70)* | 373-2273 | 4.7-6.9 |
| NbC | 293-3000 | 5.7-11.4 |
| UC | 293-2000 | 9.8-12.6 |
| ZrC | 293-3000 | 4.0-10.2 |

* It is noted that the CTE data varies depending on how it was manufactured.

It is clear that adding UC to the Gr would lead to larger differences in the CTE mismatch between the ZrC coating and the substrate. As a result, significant mass loss occurred along the length of the fuel rod closer to the hydrogen gas inlet end, which has been termed "mid-passage corrosion (erosion)". During the latter stages of the Rover/NERVA programs, (U,Zr)C composite fuels were developed to minimize the CTE mismatch between the ZrC coating and the substrate, and while this solution helped to some extent, it did not prevent the occurrence of mid-passage corrosion. Therefore, there is a need to address the mismatch between the CTE of the ZrC coating and that of the (U,Zr)Gr composite fuel substrates in NTP and other applications. Further there is a need for improved structures, compositions of matter and methods for protecting Gr-based substrates of nuclear fuel elements.

SUMMARY OF THE INVENTION

An exemplary embodiment is directed to an apparatus and a method that protects a Gr-based substrate of a nuclear fuel element from hot hydrogen attack.

A further exemplary embodiment is directed to an apparatus and method that protects a Gr-based substrate of a nuclear fuel element used in a nuclear thermal propulsion system from hot hydrogen attack.

A further exemplary embodiment is directed to an apparatus and method that minimizes debonding of a ZrC layer from a Gr-based substrate of a fuel element of a nuclear thermal propulsion system.

A further exemplary embodiment is directed to an apparatus and method that prevents or minimizes the diffusion of hydrogen into a Gr-based substrate of a fuel element used in a nuclear thermal propulsion system.

A further exemplary embodiment includes a protective coating for a substrate of a fuel element for a nuclear thermal propulsion system. The substrate is comprised of Gr-based material. The protective coating includes at least one first layer. The at least one first layer is configured to resist hot hydrogen attacks. The at least one first layer has a coefficient of thermal expansion that is close to that of the substrate. The first layer is Mo$_2$C (molybdenum carbide), Mo or a Mo—Nb alloy to act a diffusion barrier to carbon and hydrogen diffusion as well as for bonding with the Gr-based substrate. At least one second layer is located between the at least one first layer and the substrate to compensate for the CTE mismatch between the Gr-based substrate and the outer NbC or ZrC coating. The at least one second layer is configured to reduce and counteract internal stresses resulting from thermal expansion and strengthen the bonding of the coating to the substrate. An alternative configuration is to use functionally graded Mo—Nb or Mo—Nb—Zr coatings, where the composition varies from the substrate to the ZrC layer, to compensate for the CTE mismatch between the Gr-based substrate and the outer NbC or ZrC coating.

A further exemplary embodiment includes a fuel element for a nuclear thermal propulsion system. The fuel element includes a Gr-based substrate. A protective coating is applied on the Gr-based substrate. The protective coating includes at least one first layer. The at least one first layer includes at least one of ZrC and/or NbC. At least one second layer is located between the at least one first layer and the Gr-based-based substrate. The at least one second layer includes Nb or Nb—Mo or Nb—Mo—Zr alloy.

A further exemplary embodiment includes a method of forming a protective coating on a substrate of a fuel element for a nuclear thermal propulsion system. The method includes (a) depositing at least one first layer on the substrate, wherein the at least one first layer is configured to strengthen the bonding of the ZrC or NbC coating to the substrate, and (b) depositing at least one of a ZrC layer and/or a NbC layer on the at least one first layer.

A further exemplary embodiment includes a method of forming a protective coating on a substrate of a fuel element for a nuclear thermal propulsion system. The method includes (a) depositing at least one first layer on the substrate, wherein the at least one first layer is configured to strengthen the bonding of the ZrC or NbC coating to the substrate, (b) depositing at least one of a ZrC layer and/or a NbC layer on the at least one first layer, and (c) depositing at least one of a Mo, Mo—Nb alloy and/or $Mo_2C$ layer to fill in cracks in the NbC and/or ZrC coating and act as a impermeable diffusion barrier to hot hydrogen diffusion to the substrate.

A further exemplary embodiment includes a nuclear thermal propulsion system having a nuclear reactor comprised of nuclear fuel elements that include a protective coating that is configured to resist hot hydrogen attack.

DETAILED DESCRIPTION OF EXEMPLARY EMBODIMENTS

It will be readily understood that the features of exemplary embodiments may be arranged and designed in a wide variety of different configurations. Thus, the following detailed description of the exemplary embodiments of apparatus and methods is not intended to limit the scope of the inventions as claimed, but is merely representative of selected exemplary embodiments that implement the principles described herein.

The features, structures, and/or characteristics described herein may be combined in any suitable manner in one or more embodiments or arrangements. That is, a particular feature, structure, or characteristic described in connection with one embodiment may be included in at least one other embodiment or arrangement.

Figure 2:
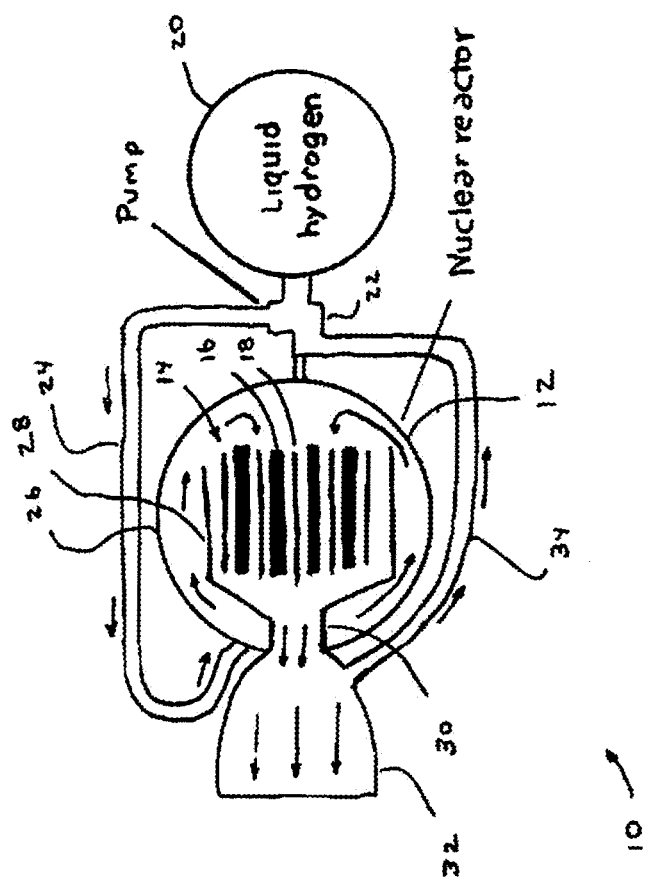
FIG. 2 is a schematic view of an exemplary nuclear thermal propulsion system.

Referring now to the drawings and particularly to FIG. 2, there is shown therein a schematic view of a NTP system generally indicated 10. This propulsion system may be used in a rocket or similar device. System 10 includes a nuclear reactor 12. Reactor 12 includes a core 14. Core 14 includes fuel rods 16 and control rods 18. The core operates to carry out a controlled nuclear reaction which generates thermal energy.

A propellant source of the nuclear thermal propulsion system is housed in a fuel tank 20. In this exemplary arrangement the fuel tank houses a working fluid that includes liquid hydrogen. Of course it should be understood that in other arrangements other working fluids may be used. The fuel tank 20 is in operative connection with a pump 22. The pump 22 is in operative connection with a conduit 24. Conduit 24 is in fluid connection with the interior area of a vessel 26 that houses the reactor.

Within the reactor vessel 26, are a series of baffles schematically indicated 28. The baffles 28 are configured to direct the working fluid to flow as desired within the vessel. The vessel includes an outlet 30. Outlet 30 is in operative connection with a rocket nozzle 32.

A further conduit 34 extends between the area adjacent outlet 30 and the pump 22. The conduit 34 is used as a bypass that conducts heated and pressurized propellant through the pump for purposes of providing a power source for the pump.

In operation, the liquid hydrogen housed in the tank 20 is moved by the pump 22 through conduit 24. The liquid hydrogen vaporizes and is heated as it moves toward the interior of the reactor vessel 26. Upon reaching the entry point in the reactor vessel, the hydrogen temperature is about 355-370 K in some exemplary NTP systems. As the hydrogen gas flows through cooling channels in the fuel elements 28, it is heated by the nuclear core. The hot hydrogen gas propellant expands through the outlet 30 and exits out the nozzle 32 to provide thrust.

A small amount of the heated and pressurized hydrogen in the area of the outlet is passed through conduit 34 to the pump 22. The high temperature gas provides a power source for driving blades of a turbine or similar structure for purposes of powering the impeller of the pump. The bypassed gas is then directed into the reactor vessel as schematically shown.

Of course it should be understood that the schematic view shown in FIG. 2 is a highly simplified version compared to an actual nuclear thermal propulsion system, and further that various types of arrangements and other types of nuclear thermal propulsion systems and other system types may be used in connection with the features described herein.

An exemplary fuel element comprises the fuel rods or similar nuclear fuel structures used in the reactor 12. In the exemplary arrangement the fuel element may be a Gr-based Gr/UC or Gr/(U,Zr)C composite. Uranium nitride (UN) or uranium oxide ($UO_2$) or mixtures of $UC/UN/UO_2$ could be used instead of UC in some applications. It is desirable that the Gr-based substrate of the exemplary fuel element be protected from hot hydrogen attacks.

The exemplary fuel element includes a Gr-based substrate that is coated with either a NbC or ZrC layer. ZrC has a high melting point (approximately 3523 K) and a CTE of 4.0-10.2 μm/m·K. Alternatively, the Gr-based substrate may be coated with a NbC layer, which has a high melting point (approximately 3763.15 K) and a CTE of 5.7-11.4 μm/m·K. Applying a coating of either ZrC or NbC to a Gr-based fuel element makes it more resistant to hot hydrogen exposure than uncoated Gr-based fuel elements such as the conditions in a nuclear thermal propulsion system.

Unfortunately, the NbC or ZrC coating tends to debond from the Gr-based substrate either during coating deposition or during subsequent use in the nuclear thermal propulsion application. This occurs due to differences in the CTEs of the Gr-based substrate and the ZrC or NbC protective coating (Table 1). This debonding causes the coating to detach from the substrate so that the hydrogen penetrates the protective ZrC or NbC coating and reacts with the Gr to form hydrocarbon gases thereby leading to corrosion (erosion) of the Gr-based substrate resulting in mass loss.

To combat this problem, an exemplary coating on the Gr-based substrate may further include depositing additional compliant layers between the outer ZrC or NbC coating and inner Gr-based substrate in order to reduce the stresses due to differences in the CTE mismatch between the ZrC or NbC layer and the Gr-based substrate. In addition, the compositions of these exemplary coatings are configured to prevent or minimize the diffusion of hydrogen into the Gr-based substrate. Specifically, an exemplary coating includes a diffusion barrier to prevent or slow down the diffusion of the hydrogen through the protective coating to the Gr-based substrate during the operational life of the component. In some embodiments a diffusion layer may also be applied on the outer surface of the ZrC or NbC coating between the flowing hydrogen gas and the ZrC or NbC coating. The ZrC or NbC layer may also be stengthened to suitably minimize the creep of the coating. The elements forming the exemplary protective coating have high melting points and possess a low neutron absorption cross-section which makes them more suitable for nuclear applications.

Figure 3:
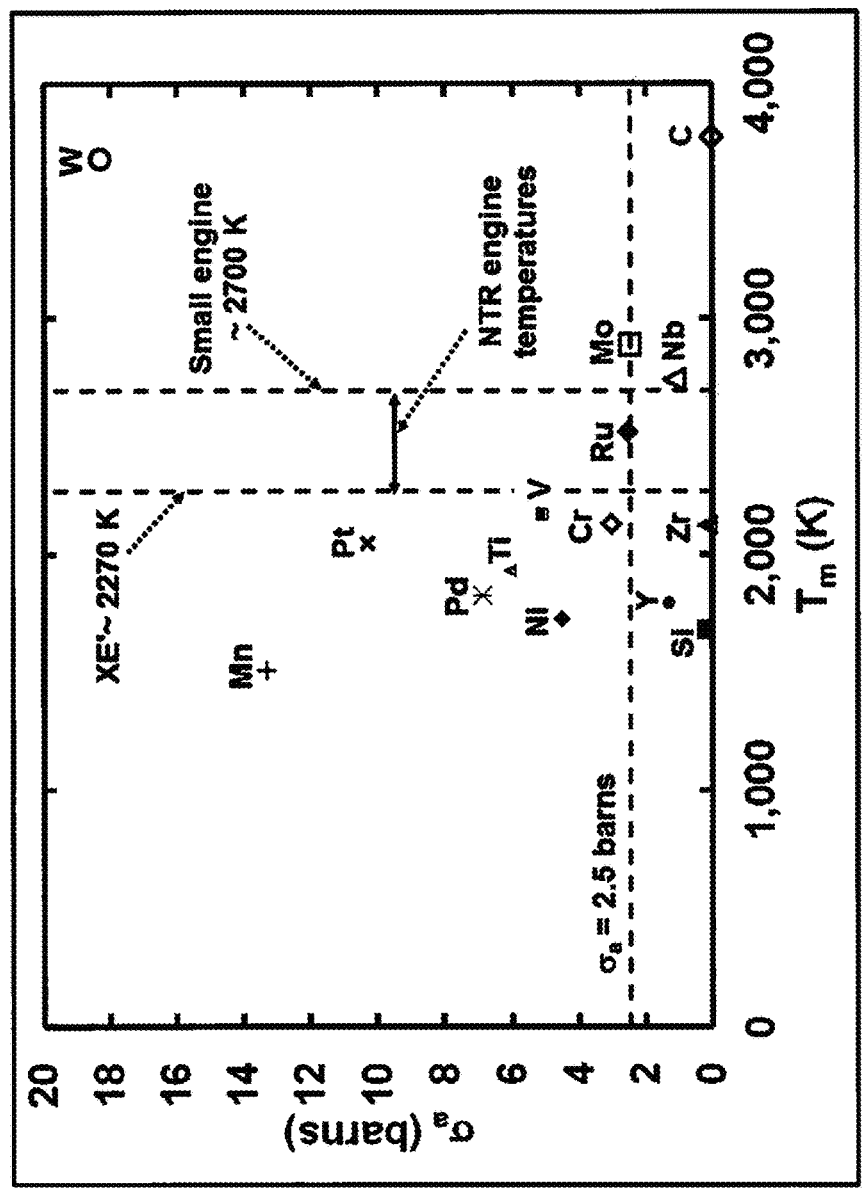
FIG. 3 is a graph showing a plot of the neutron absorption cross-sectional area $\sigma_a$ against the absolute melting points $T_m$ for several elements.
Figure 4:
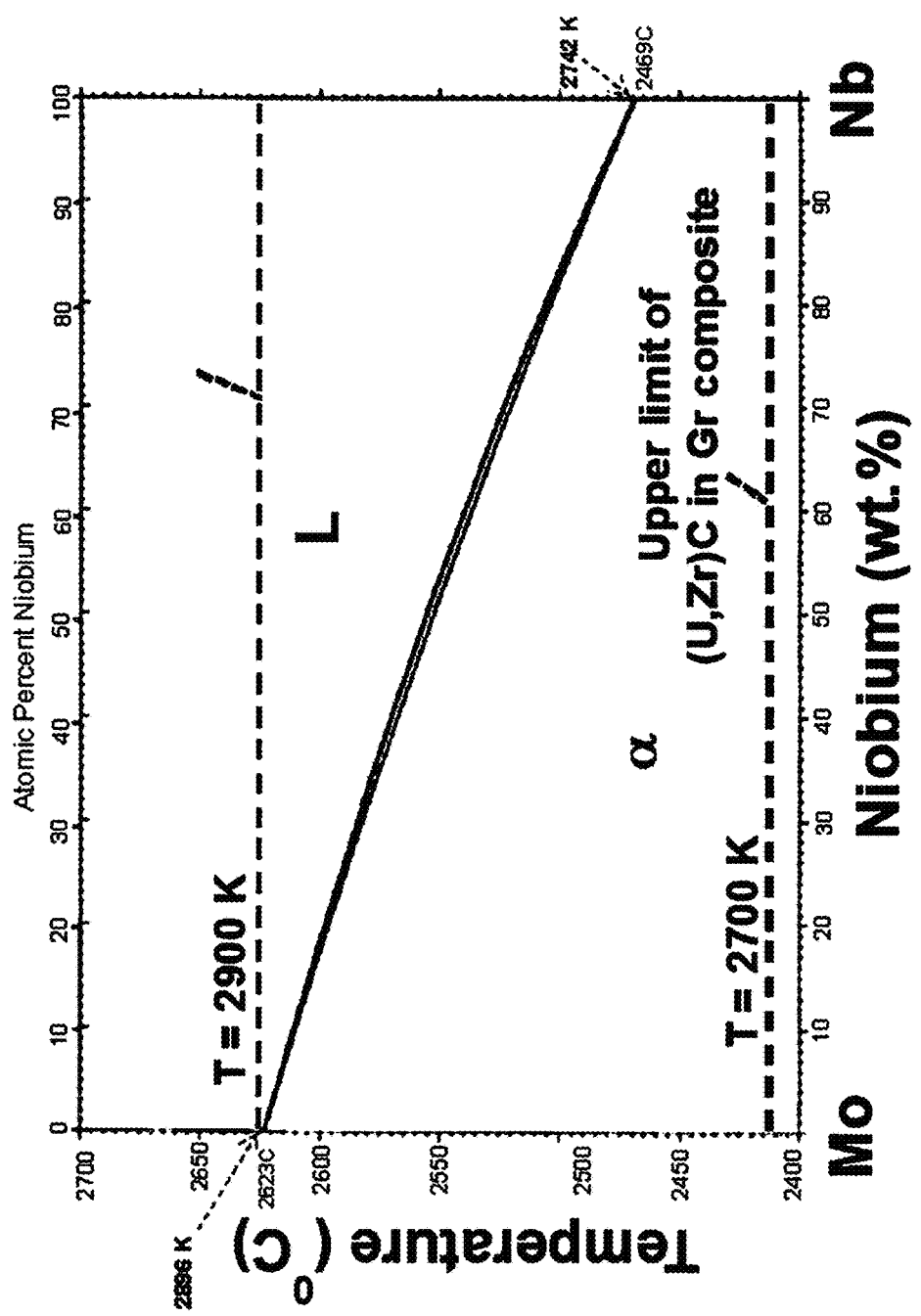
FIG. 4 is a Mo—Nb binary phase diagram showing complete soluability of the two elements.
Figure 5:
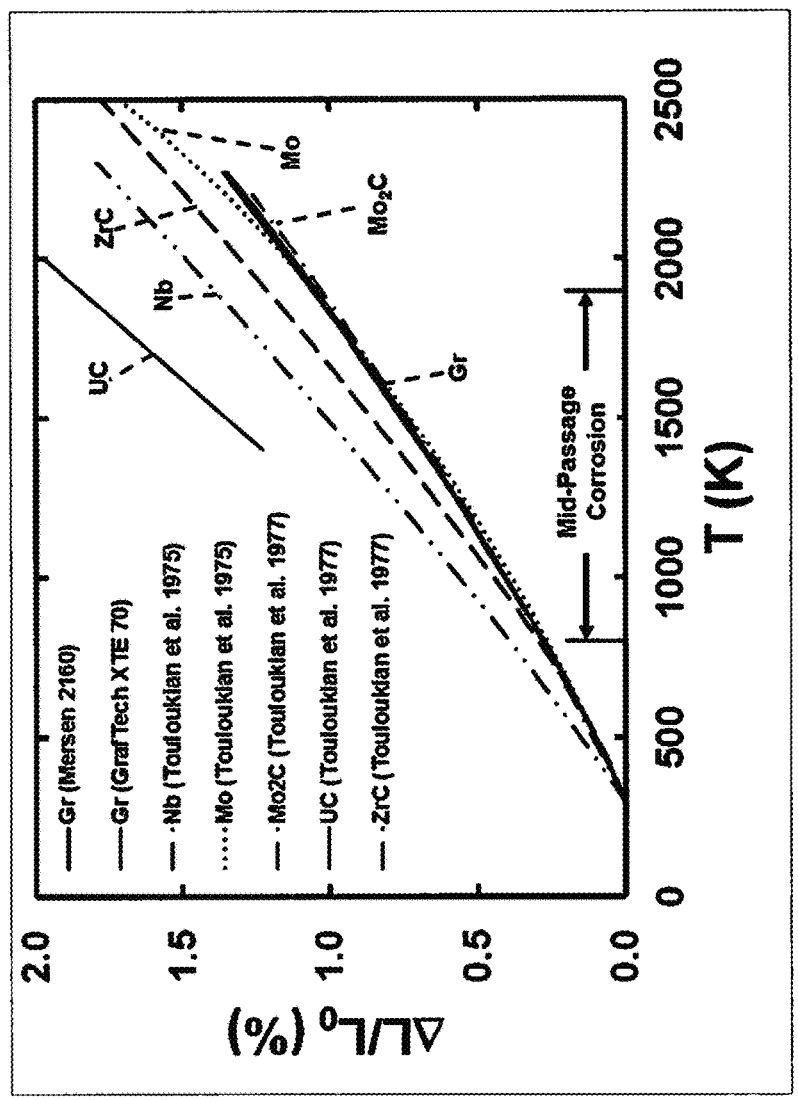
FIG. 5 is a plot comparing the thermal expansion behavior of Gr, Mo, Nb, Mo-25% Nb, Mo-50% Nb, Mo-75% Nb, UC and ZrC.

Two desirable materials properties for the fuel elements and coatings for NTP engines are high absolute melting points, $T_m$, and low neutron absorption cross-section, $\sigma_a$. FIG. 3 shows the plot of $\sigma_a$ against $T_m$, where it is evident that Mo, Nb and C lie in the bottom right hand corner of the plot corresponding to $T_m$>2700 K and $\sigma_a$<2.5 barns. Thus, Mo, Nb and their alloys, as well as $Mo_2C$, are suitable for use as intermediary layers between the outer ZrC or NbC coating and the inner Gr-based substrate. The Mo—Nb binary phase diagram shows complete solid solubility, which is a distinct advantage since many of the properties can be adjusted almost linearly by changing the composition (FIG. 4). The thermal expansion of Mo and $Mo_2C$ are close to that of Gr, and the thermal expansion of Nb is close to that of ZrC (FIG. 5). Additionally, Mo, Nb and Mo—Nb will be ductile at the NTP operating temperatures, which allows these layers to be compliant to any stress build-up due to any CTE mismatch. Mo has low permeability to hydrogen gas, which is desirable in NTP engine applications.

Figure 6:
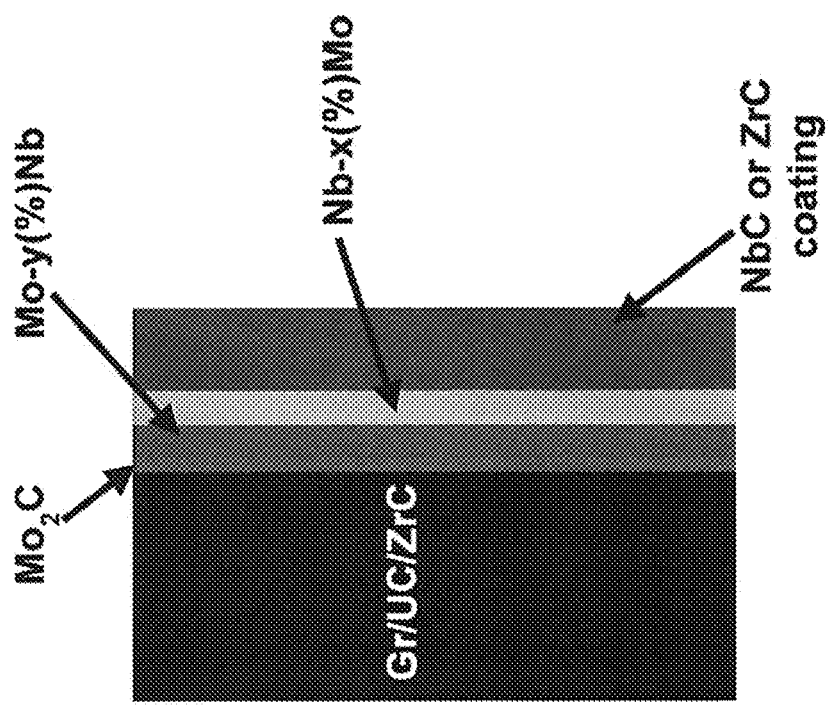
FIG. 6 is a schematic cross-sectional view of an exemplary fuel element for a nuclear thermal propulsion system with an exemplary coating architecture for the Gr based substrate.

Represented in FIG. 6 is an exemplary coating of multiple layers overlying the Gr-based substrate 36 In this exemplary arrangement the coating includes an outer protective layer 38 consisting of ZrC or NbC. The coating includes an inner layer 40 comprising one or more layers of Nb, Mo, and/or a Mo—Nb alloy. The inner layers 40 may also include $Mo_2C$ next to the Gr-based substrate.

Alternatively, in other exemplary embodiments an additional Mo, Mo—Nb alloy and/or $Mo_2C$ layer can be deposited on the NbC or ZrC layer 38. This additional Mo, Mo—Nb alloy and/or $Mo_2C$ layer is positioned between the hot hydrogen gas and the ZrC or NbC layer to act as diffusion barriers and crack sealants to minimize hydrogen diffusion towards the Gr/(U,Zr)C substrate as well as to protect the NbC or ZrC layer from hydrogen attack at very high temperatures.

The coating layers may be deposited on the Gr-based substrate by CVD or a similar gas diffusion or electrochemical process or additive manufacturing. In exemplary arrangements thicknesses of each layer varies between 15 to 150 μm. The thickness may vary based on the processing conditions, design requirements and applications.

For the example protective coating shown in FIG. 6, the fuel element includes an inner layer comprised of multiple layers. These layers are applied either by depositing a layer of $Mo_2C$ on the Gr-based substrate by CVD, or by direct chemical reaction of the Mo layer with the Gr substrate. A second layer of either Mo or a Mo—Nb alloy of this example is then either deposited directly or grown by in-situ reaction between the Gr-based substrate and a deposited Mo layer on the $Mo_2C$. The exemplary second layer of either Mo or Mo—Nb alloy of this example has 15% Nb (i.e. Mo-15 (at. %) Nb). A third layer of either Nb or Mo—Nb alloy is then deposited on the second layer of Mo—Nb alloy. The third layer of Mo—Nb alloy has 35% Nb (i.e. Mo-35 (at. %) Nb). The outermost layer of ZrC is then deposited on the second layer of the Mo—Nb alloy. Of course, as previously indicated, this particular structure for the protective coating is exemplary.

As previously mentioned, the ZrC outer layer has a high melting point (approximately 3523 K) and CTE of 4.0-10.2 μm/m·K which makes the ZrC layer resistant to hot hydrogen attacks. Further, as previously discussed in some exemplary embodiments the coating architecture may further include a diffusion/sealant layer of Mo, Mo—Nb alloy and/or $Mo_2C$ overlying the outer ZrC layer. This additional layer may further serve to decrease the permeability of the coating architecture to hydrogen.

The layers of the Mo—Nb alloys of the example protective coating are compositionally-graded coatings that minimize the CTE differences between ZrC and the Gr-based substrate. The Mo—Nb layers are compliant so that differences in the thermal expansion of ZrC and other layers can be accommodated without significant debonding or cracking. The Mo—Nb layers also act as diffusion barriers to hyrdrogen diffusion. Finally, the innermost $Mo_2C$ layer of the exemplary arrangement acts as a diffusion barrier to mitigate the diffusion of carbon into the Mo—Nb layers and the diffusion of Mo and Nb into the Gr-based substrate.

Figure 1:
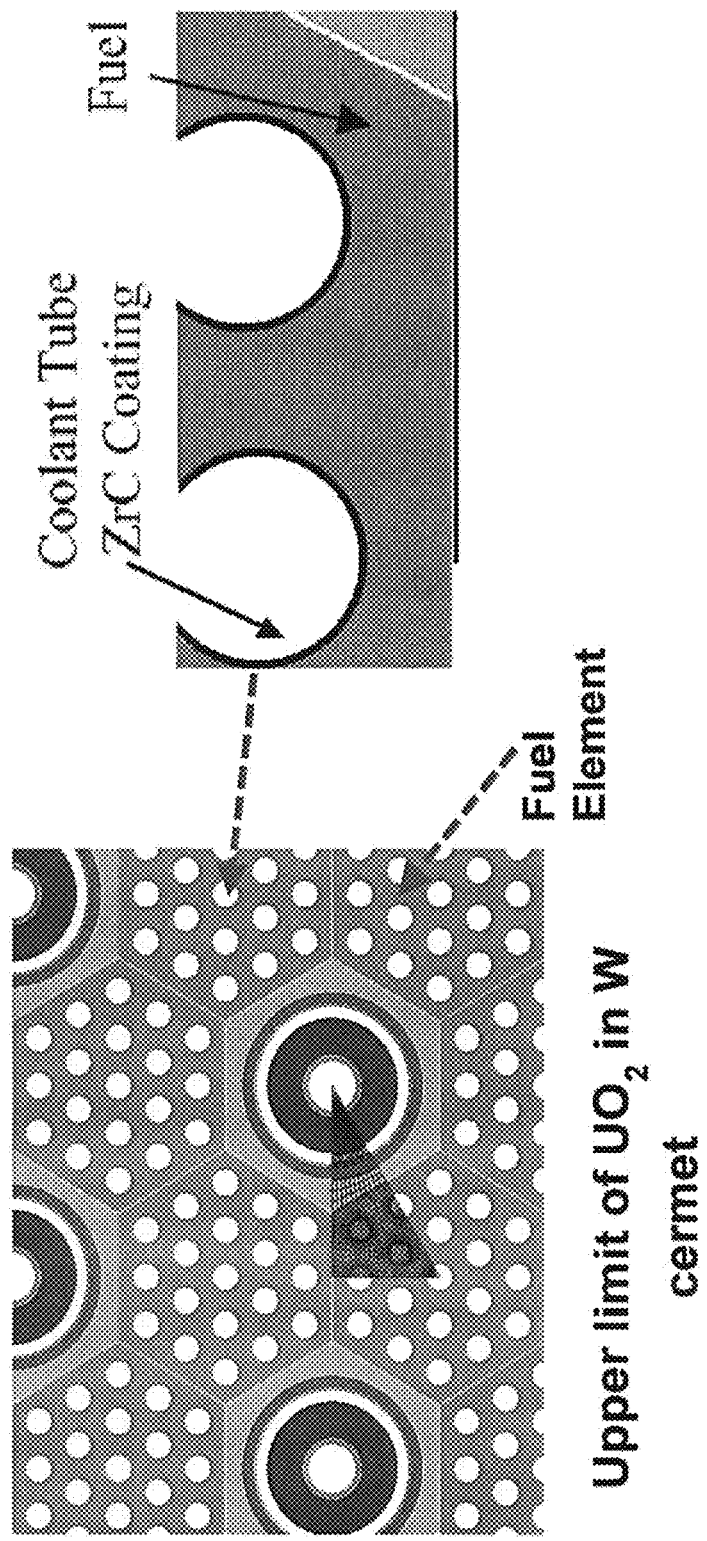
FIG. 1 is a schematic representation of the layout of the fuel elements supported by tie rods with the inner surfaces of the coolant tubes in each fuel element coated with either NbC or ZrC as in the prior art NERVA/Rover NTP programs.
Figure 7:
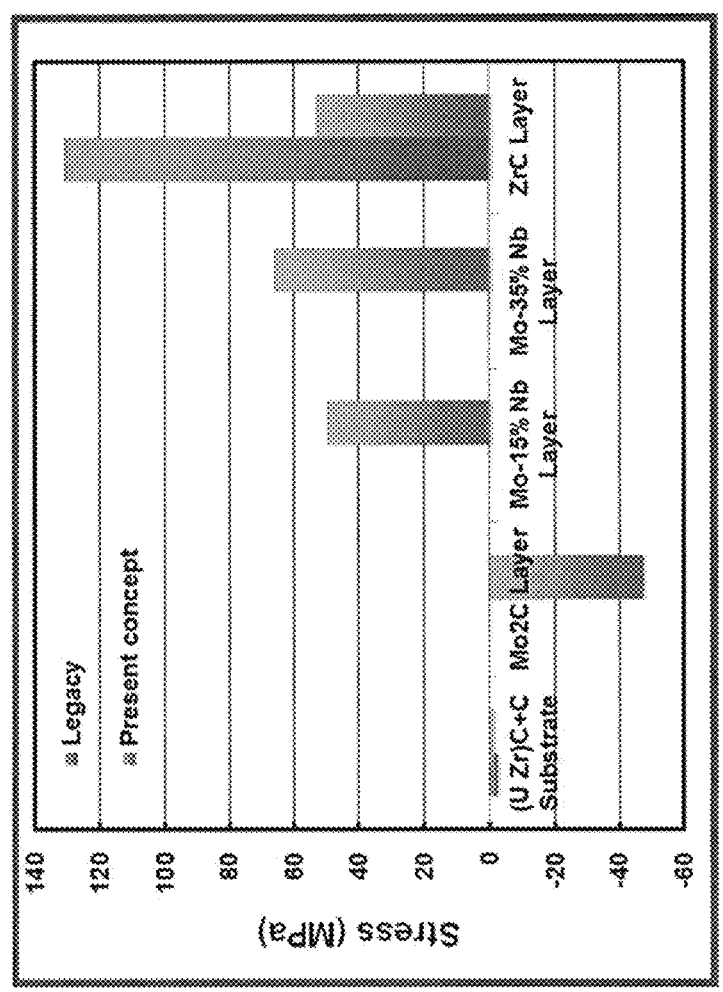
FIG. 7 is a bar graph comparing the calculated residual stresses in layers of an exemplary multi-layer coating architecture including ZrC/Mo-35% Nb/Mo-15% Nb/$Mo_2C$/Gr with a single layer coating architecture of ZrC/Gr on the Gr-based substrate.

As an example, FIG. 7 compares the predicted residual stress of the exemplary four layer ZrC/Mo-35 (at. %) Nb/Mo-15 (at. %) Nb/$Mo_2C$/Gr protective coating with that in the single layer ZrC/Gr coating in the prior art represented in FIG. 1. As shown in FIG. 7, the ZrC coating layer in a fuel element consisting of the conventional ZrC/Gr NERVA-type coating architecture has a residual stress of about 130 MPa.

By contrast, an exemplary protective coating of fuel element depicted in FIG. 7 includes a Gr-based substrate coated with an innermost layer of $Mo_2C$ deposited directly on the Gr-based substrate by CVD. A first layer of Mo—Nb alloy is deposited on the $Mo_2C$. A second layer of Mo—Nb alloy is deposited on and overlies the first layer of Mo—Nb alloy. An outermost layer of ZrC is deposited on and overlies the second layer of the Mo—Nb alloy. As an example, the first innermost layer of Mo—Nb alloy has 15% Nb (i.e. Mo-15 (at. %) Nb) and the second layer of Mo—Nb alloy has 35% Nb (i.e. Mo-35 (at. %) Nb). FIG. 7 shows the calculated residual stresses in the individual layers of the exemplary 4 layer protective coating architecture. Specifically, the predicted residual stress in the ZrC coating layer in a fuel element consisting of ZrC/Mo-35% Nb/Mo-15% Nb/$Mo_2$C/Gr is about 50 MPa and those in the two Mo/Nb layers are approximately 40 and 65 MPa. The calculated residual stress in the $Mo_2C$ layer is approximately −45 MPa. In this exemplary arrangement the residual stress at the Gr-based substrate interface is near zero.

The adverse effects resulting from thermal expansion are largely counteracted through the use of the multilayer protective coating. As a result, the underlying Gr-based layer is less likely to be exposed to destructive hot hydrogen gas during operation in a nuclear thermal propulsion system or other working environment. An alternative embodiment may also include coating the outer layer of the ZrC or NbC with a thin layer of Mo, Mo—Nb alloy and/or $Mo_2C$ in the range of 0.5 to 10 μm in thickness.

As shown in FIG. 4, the Mo—Nb binary phase diagram is isomorphous with complete solid solubility between the two elements. As a result, the melting points, neutron absorption cross-sections, mechanical properties and CTE of the multi-layered coatings can be varied to develop layers with different combinations of coating compositions to satisfy various nuclear operating requirements. Also, varied protective coating layers with different combinations of components and thicknesses can be used to meet the demands of different nuclear thermal propulsion engine designs. For example, in alternative embodiments the ZrC outer layer can be replaced with NbC or variations of (Nb,Zr)C with different amounts of Nb varying between 0 and 100 at. % depending on the melting point and other operating environment conditions. In another example, the Mo—Nb coating can be varied between 100 (at. %) Mo to 100 (at. %) Nb depending on specific application requirements.

The addition of Si, Zr, Ru and/or Y to the Mo—Nb layers can be used to decrease the neutron absorption cross-section. In alternative embodiments, the protective coating may not include the $Mo_2C$ layer. The $Mo_2C$ could be replaced by $Mo_2N$, $Nb_2N$, NbC and/or $(Mo,Nb)_2N$ $(Mo,Nb)_2C$ variations with different amounts of Mo, Nb, C and N. The use of Mo and/or Nb nitride layers are likely to be important in embodiments in which the fuel is changed from UC to UN. This metal carbide or nitride layer may act as a diffusion barrier and serves to minimize the diffusion of C or N out of the substrate to the metallic multi-layered coatings. Depending on the engine design and the desired operating life, this layer could be varied between about 0.5 and 10 μm. The $Mo_2C$, $Mo_2N$ and/or $(Mo,Nb)_2N$ can be deposited either directly from the gaseous phase through a chemical reaction or by depositing the metal (i.e. Mo and/or Nb) and reacting with the C and N in the substrate.

Figure 8:
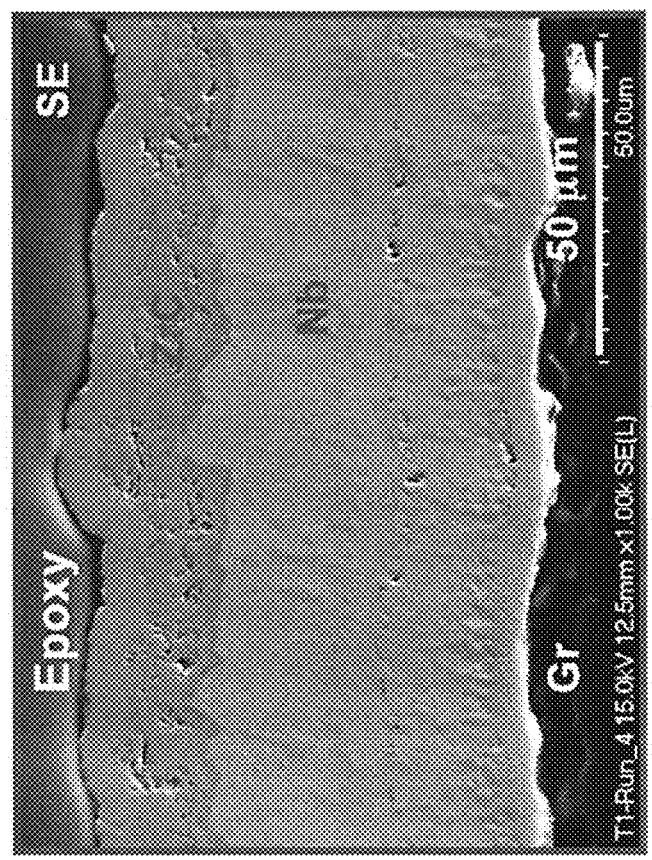
FIG. 8 is a secondary electron micrograph of a cross-section of an exemplary multi-layer coating architecture.
Figure 9:
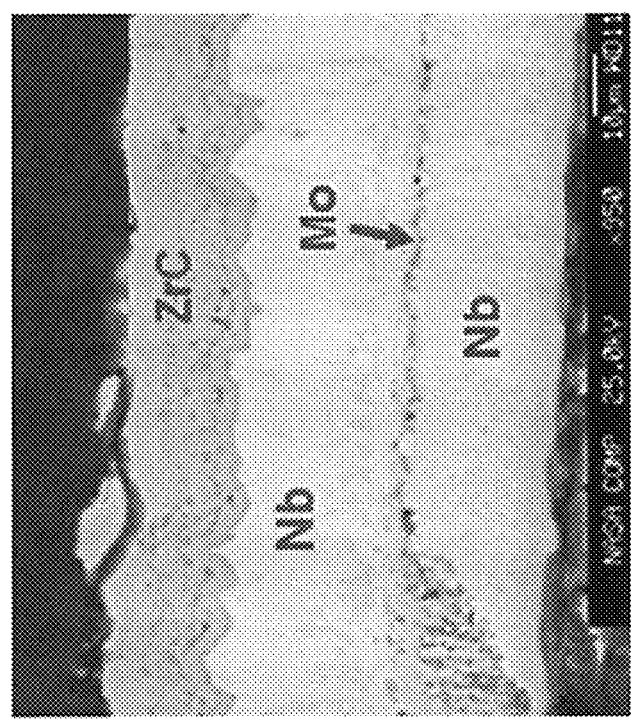
FIG. 9 is a back scattered electron micrograph of a cross-section of an exemplary ZrC/Nb/Mo/Nb/Gr coating architecture.

FIG. 8 shows another exemplary embodiment of a fuel element with a ZrC/Nb/Gr architecture. In this arrangement the coating layers were sequentially deposited on a Gr-based substrate by CVD. FIG. 9 shows another exemplary embodiment of a fuel element with a ZrC/Nb/Mo/Nb/Gr architecture, wherein the coating layers were sequentially deposited on the Gr-based substrate by CVD. Alternative deposition methods could include low pressure CVD, ultra-high vacuum CVD, atomic layer CVD and other similar depositon proceeses conducted under low pressure or ultra high vacuum conditions in a reactor chamber. Other deposition techniques could include electrodeposition of Mo, Nb and Zr from either aqueous solutions or molten salt baths.

Exemplary embodiments of the coating may include alternative compositions for the outermost layer of ZrC that are also resistant to hot hydrogen attacks. For example, the outermost layer may be comprised of other carbides such as NbC, WC. Other exemplary compositions of the outermost layer may be comprised of ZrN or $Nb_2N$.

The exemplary arrangements are discussed in connection with a protective coating for a nuclear fuel element that includes a Gr-based substrate. An exemplary application for the described element is used in nuclear thermal propulsion systems. However, the approaches and coatings described may also be advantageously used in other applications to prevent hydrogen attack of Gr-based based compositions. Such approaches may be advantageously used in commercial, military and/or aerospace applications. Further it should be understood that although the exemplary approach is described in connection with nuclear fuel elements, the protective coating approaches described may also be utilized in connection with other types of Gr-based or other material components that need to be protected from hot hydrogen or other destructive materials at high temperatures. Further it should be understood that the approaches described are exemplary and those skilled in the art may devise other arrangements based on the teachings presented herein.

Although the exemplary arrangements have been described based upon certain embodiments, a wide array of modifications, variations, and alternative constructions are also within the spirit and scope of the principles described herein. Example arrangements for a protective coating for a Gr-based substrate based element have been described herein with reference to particular components, features, properties, attributes, relationships, and methods. However, it should be understood that in other embodiments other arrangements may include other components, features, properties, attributes, relationships, and/or methods which provide similar capabilities and functionality.

It will be readily understood that the features of exemplary embodiments, as generally described and illustrated in the Figures herein, can be arranged and designed in a wide variety of different configurations. That is, the features, structures, and/or characteristics of embodiments or arrangements described herein may be combined in any suitable manner in one or more other embodiments or arrangements. Thus, the detailed description of the exemplary embodiments of apparatus and method, as represented in the attached Figures, is not intended to limit the scope of the invention as claimed, but is merely representative of selected exemplary embodiments that implement the principles described herein.

In the foregoing description, certain terms may have been used to describe example arrangements for purposes of brevity, clarity, and understanding. For example, certain terms like "inner", "outer", "upward", "downward", "higher", "lower", "left", "right", "outer", "inner", "front", "rear", "top", and "bottom" may have been used. However, no unnecessary limitations are to be implied therefrom because such terms have been used for descriptive purposes and are intended to be broadly construed. The terms are not to present limitations on the scope of the exemplary embodiments, as defined by the claims hereof. Moreover, the descriptions and illustrations herein are by way of examples and the inventive teachings are not limited to the specific details shown and described.

The novel structure, along with the methods of preparing and using the novel structure, achieves at least one of the above stated objectives, eliminates difficulties encountered in the use of prior devices and systems, solves problems, and attains the desirable results described herein.

In the following claims, any feature described as a means for performing a function shall be construed as encompassing any means capable of performing the recited function, and shall not be limited to the particular means for performing the function in the foregoing description, or mere equivalents.

Having described the features, discoveries and principles of the invention, the manner in which it is constructed and operated and the advantages and useful results attained, the new and useful structures, devices, elements, arrangements, parts, combinations, systems, equipment, operations, methods, processes, and relationships are set forth in the appended claims.

We claim:

1. A nuclear thermal propulsion system fuel element comprising:
   a graphite-based substrate having a nuclear fuel embedded therein; and
   a protective coating disposed on the graphite-based substrate, the protective coating comprising:
      at least one first layer, wherein the at least one first layer is configured to resist hot hydrogen attacks, wherein the at least one first layer has a coefficient of thermal expansion that is higher than a coefficient of thermal expansion of the graphite-based substrate;
      at least one second layer, wherein the at least one second layer is located between the at least one first layer and the graphite-based substrate, wherein the at least one second layer is configured to mitigate mismatch between coefficients of thermal expansion of the at least one first layer and the substrate, whereby debonding of the protective coating from the substrate is minimized; and
      at least one third layer, wherein the at least one third layer is located between the at least one second layer and the graphite-based substrate, wherein there is a direct chemical reaction of the at least one third layer and the graphite-based substrate.

2. The nuclear thermal propulsion system fuel element according to claim 1 wherein the at least one first layer is a carbide.

3. The nuclear thermal propulsion system fuel element according to claim 2 wherein the at least one first layer includes ZrC.

4. The nuclear thermal propulsion system fuel element according to claim 1 wherein the at least one second layer includes Nb.

5. The nuclear thermal propulsion system fuel element according to claim 1 wherein the at least one third layer includes Mo.

6. The nuclear thermal propulsion system fuel element according to claim 5 wherein the at least one third layer comprises 100% Mo.

7. The nuclear thermal propulsion system fuel element according to claim 5, wherein the protective coating further comprises:
   at least one fourth layer located between the at least one third layer and the at least one second layer, wherein the at least one fourth layer includes an Mo—Nb alloy.

* * * * *